(12) United States Patent
Welz et al.

(10) Patent No.: US 11,191,209 B2
(45) Date of Patent: Dec. 7, 2021

(54) MOWER DECK LEVEL ADJUSTER

(71) Applicant: Deere & Company, Moline, IL (US)

(72) Inventors: Frank M. Welz, Beaver Dam, WI (US); Kyle T. Ressler, West Bend, WI (US)

(73) Assignee: DEERE & COMPANY, Moline, IL (US)

( * ) Notice: Subject to any disclaimer, the term of this patent is extended or adjusted under 35 U.S.C. 154(b) by 464 days.

(21) Appl. No.: 15/935,794

(22) Filed: Mar. 26, 2018

(65) Prior Publication Data

US 2019/0289783 A1    Sep. 26, 2019

(51) Int. Cl.
*A01D 34/74* (2006.01)
*A01D 34/81* (2006.01)
*A01D 101/00* (2006.01)

(52) U.S. Cl.
CPC .............. *A01D 34/74* (2013.01); *A01D 34/81* (2013.01); *A01D 2101/00* (2013.01)

(58) Field of Classification Search
CPC ........ A01D 34/74; A01D 34/81; A01D 34/00; A01D 34/001; A01D 34/82; A01D 34/86; A01D 34/661; A01D 34/866; A01D 2101/00; A01D 2034/645
See application file for complete search history.

(56) References Cited

U.S. PATENT DOCUMENTS

| | | | | |
|---|---|---|---|---|
| 3,672,696 A | * | 6/1972 | Akgulian | A01D 34/54 280/15 |
| 3,874,150 A | * | 4/1975 | Boeck | A01D 34/74 56/17.1 |
| 4,015,407 A | * | 4/1977 | Bacon | A01D 34/826 56/255 |
| 4,325,211 A | * | 4/1982 | Witt | A01D 34/662 56/15.8 |
| 4,760,686 A | * | 8/1988 | Samejima | A01D 34/74 56/15.8 |
| 4,840,020 A | | 6/1989 | Oka | |
| 4,869,057 A | * | 9/1989 | Siegrist | A01D 34/64 56/15.9 |
| 5,065,568 A | * | 11/1991 | Braun | A01D 34/64 56/14.9 |
| 5,142,850 A | | 9/1992 | Patterson et al. | |
| 5,398,489 A | | 3/1995 | Oshima | |
| 5,797,252 A | * | 8/1998 | Goman | A01D 34/74 56/17.2 |
| 5,956,932 A | * | 9/1999 | Schmidt | A01D 34/64 56/15.6 |
| 6,023,921 A | * | 2/2000 | Burns | A01D 34/64 56/15.9 |

(Continued)

FOREIGN PATENT DOCUMENTS

WO         9962320 A1    12/1999

*Primary Examiner* — Adam J Behrens

(57) ABSTRACT

A mower deck level adjuster includes a pair of draft links connected to a frame of a grass mowing machine and pivotable to a plurality of different cutting heights using a foot pedal or hand lever for raising and lowering the mower deck. A pair of adjuster brackets may be attached to the pair of draft links and to a pair of deck brackets on the mower deck. Each adjuster bracket may be pivotable to a plurality of different positions relative to the draft links to secure the mower deck at a level position.

17 Claims, 4 Drawing Sheets

(56) References Cited

U.S. PATENT DOCUMENTS

| | | | | |
|---|---|---|---|---|
| 6,038,841 | A * | 3/2000 | Bates, Jr. | A01D 34/74 56/15.6 |
| 6,481,194 | B1 * | 11/2002 | Brewer | A01D 34/74 56/15.8 |
| 6,484,481 | B1 * | 11/2002 | Langworthy | A01D 75/30 56/6 |
| 7,028,456 | B2 | 4/2006 | Thatcher et al. | |
| 7,197,863 | B1 * | 4/2007 | Sugden | A01D 34/66 56/15.8 |
| 7,600,363 | B2 * | 10/2009 | Porter | A01D 34/64 56/17.1 |
| 7,861,502 | B1 * | 1/2011 | Benway | A01D 34/74 56/10.8 |
| 8,438,822 | B2 * | 5/2013 | Lancaster | A01D 34/74 56/17.1 |
| 8,544,249 | B2 | 10/2013 | Goebert et al. | |
| 9,003,751 | B2 * | 4/2015 | Lancaster | A01D 34/74 56/17.1 |
| 2008/0295477 | A1 * | 12/2008 | Porter | A01D 34/64 56/229 |
| 2015/0296711 | A1 * | 10/2015 | Haun | A01B 63/104 56/10.1 |
| 2020/0096029 | A1 * | 3/2020 | Welz | A01D 34/824 |

* cited by examiner

MOWER DECK LEVEL ADJUSTER

FIELD OF THE INVENTION

This invention relates to grass mowing machines, and more specifically to a mower deck level adjuster.

BACKGROUND OF THE INVENTION

A mower deck may be suspended from a lawn and garden tractor or other vehicle, or "floated" on wheels attached to the mower deck. The mower deck may cover one or more rotary cutting blades. When a mower deck is suspended from a vehicle frame, the mower deck and blades should be in proper alignment relative to the mowing vehicle at all cutting heights. For example, the mower deck should be properly aligned so that each rotary cutting blade is level side-to-side, and has a slight forward angle or "rake." Proper alignment of the mower deck helps achieve better cut quality, prevents grass frazzling, provides better grass dispersal, better bagging results, and reduces the power required to run the engine. Additionally, the mower deck should be calibrated so that the blades are at the cutting height specified by the mower deck height control knob or lever.

For example, measurements can be taken from a hard, level floor or ground surface under the vehicle up to the tip of a rotary cutting blade. To check if the mower deck is level side-to-side, the blades may be manually rotated to a position parallel to the vehicle axle and measurements are taken from the ground up to the left and right outside blade tips. To check if the mower deck is properly aligned front-to-rear, the blades may be rotated to point straight forward and backward, and measurements may be taken from the ground up to the front and rear blade tips. Alternatively, a mower deck level gauge and procedure may be used to level and align a mower deck, as shown in U.S. Pat. No. 8,544,249 assigned to Deere & Company of Moline, Ill. A one-piece gauge is dimensioned to fit under each deck level measuring point at a specified cutting height.

After the measurements, one or more adjustments may be made on the linkages between the mower deck and vehicle frame. For example, to level the mower deck side-to-side, a nut or other connector on the left rear draft link may be turned to raise or lower the left side of them mower deck. The linkages may include threaded hangers, cams, or slotted mounting brackets attaching the deck to the vehicle frame. However, it is difficult for most operators to access the proper adjustment linkage and make adjustments using a wrench or similar tool. As a result, deck leveling is a slow and uncomfortable task that is often neglected or performed inadequately, resulting in uneven cut quality. A top adjusting linkage for leveling a mower deck is shown in U.S. Pat. No. 7,861,502 assigned to Deere & Company of Moline, Ill. A hand tool may be inserted through an access hole in the fender deck to engage the upper end of a threaded lift rod, and turn the lift rod to change its effective length.

A mower deck level adjuster is needed that does not require use of hand tools to engage and turn threaded linkages, or to secure the mower deck at a level position. A mower deck level adjuster is needed that is inexpensive and may be installed on existing height of cut systems on conventional mower decks.

SUMMARY OF THE INVENTION

A mower deck level adjuster may include a pair of adjuster brackets pivotably attached to a pair of draft links supported by a frame of a grass mowing machine. The pair of adjuster brackets are connected to the mower deck and are pivotable with respect to the pair of draft links to level the mower deck. The rearward end of each adjuster bracket may be connected to the mower deck by a pivot pin, and a forward end of each adjuster bracket may be connected to one of the draft links by a pin inserted through any of a plurality of adjuster holes in the adjuster bracket.

DESCRIPTION OF THE PREFERRED EMBODIMENT

Figure 1:
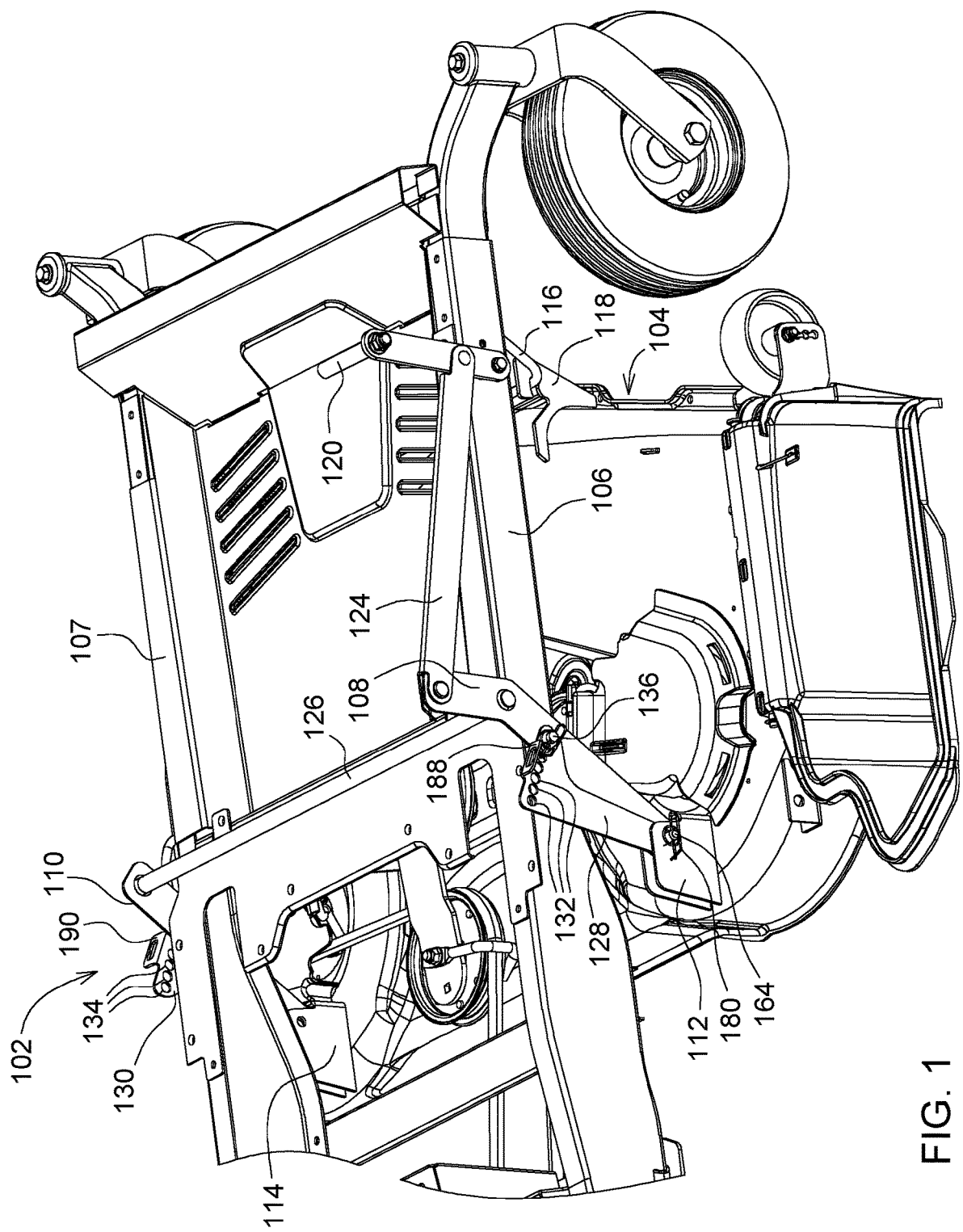
FIG. 1 is a side perspective view of a mower deck level adjuster according to a preferred embodiment of the invention.
Figure 2:
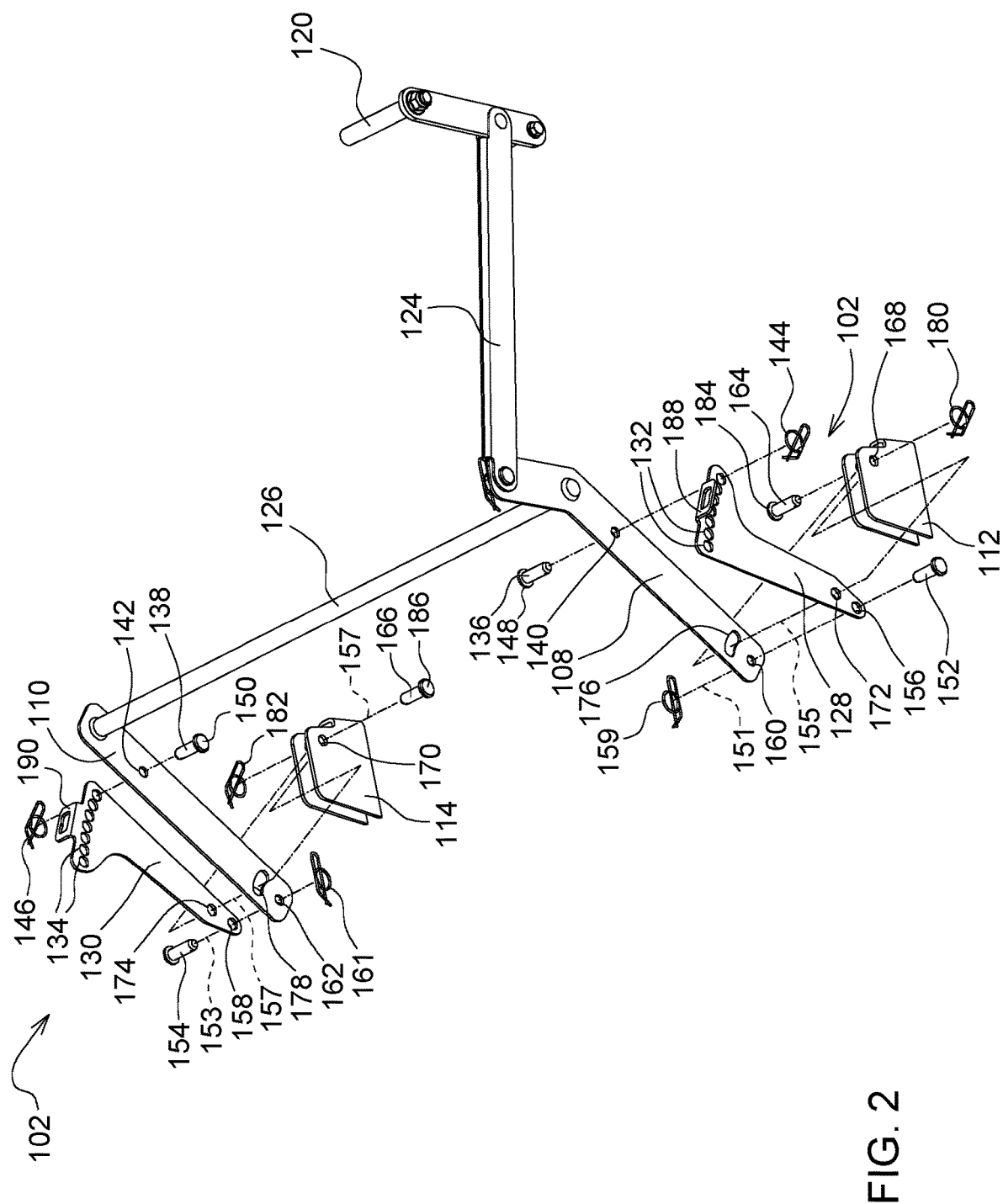
FIG. 2 is an exploded side perspective view of the adjuster brackets and rear draft links of a mower deck level adjuster according to a preferred embodiment of the invention.
Figure 3:
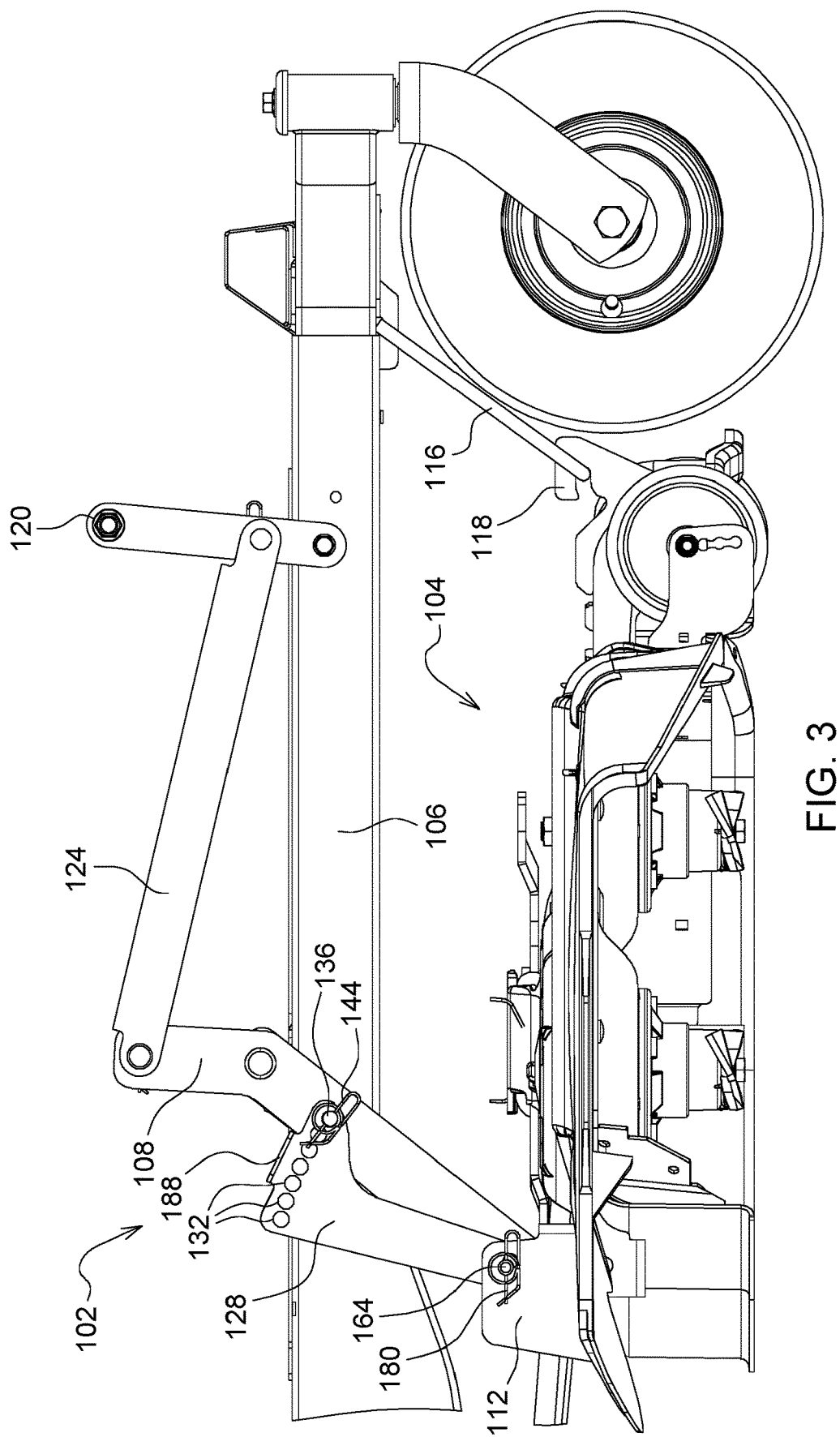
FIG. 3 is a side view of a mower deck level adjuster in a first position according to a preferred embodiment of the invention.
Figure 4:
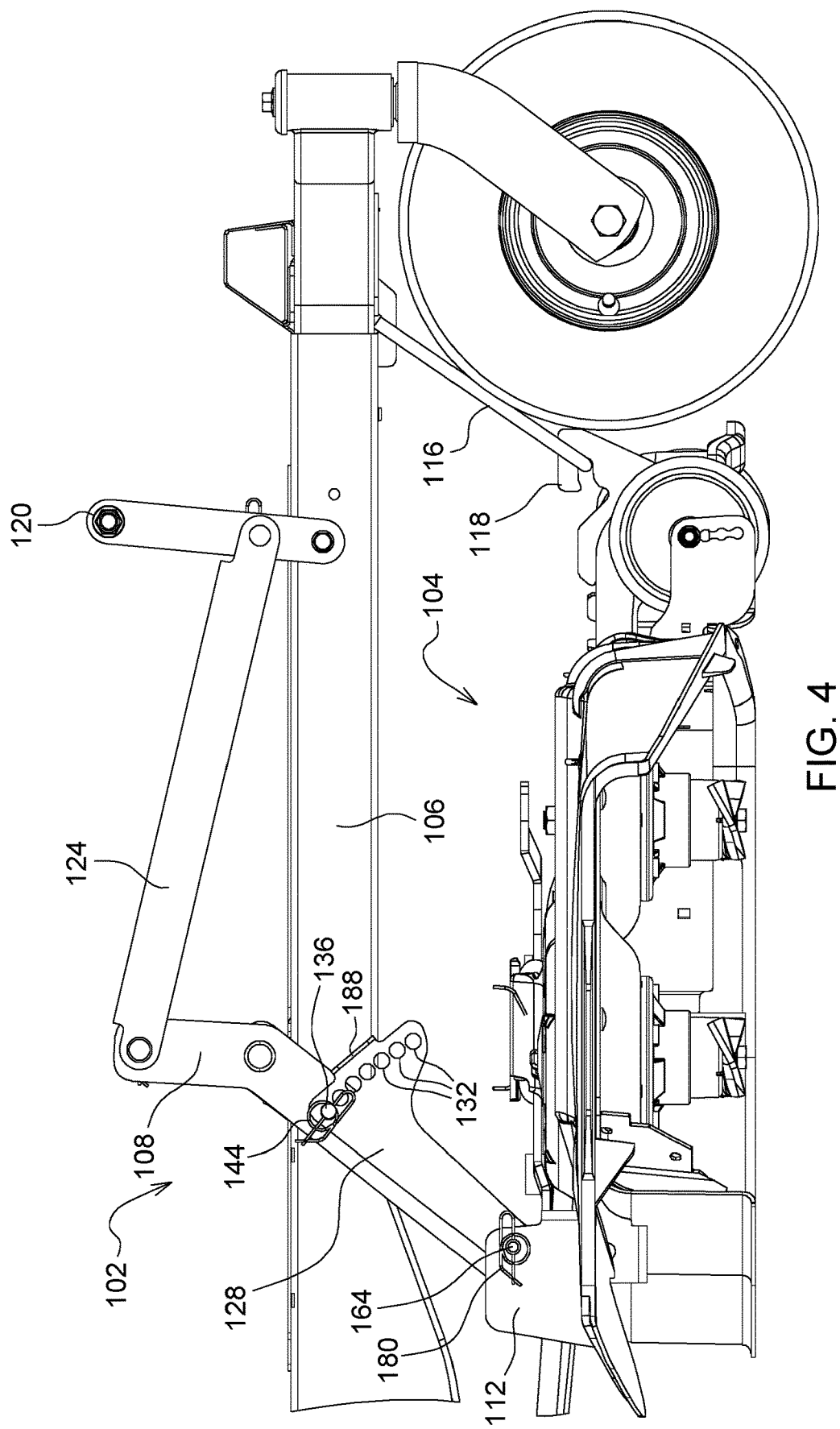
FIG. 4 is a side view of a mower deck level adjuster in a second position according to a preferred embodiment of the invention.

In a preferred embodiment shown in FIGS. 1-4, mower deck level adjuster 102 may be used to level mower deck 104, without hand tools to engage any part of the adjuster, turn any threaded linkages, or secure the mower deck at a level position. Mower deck 104 may be suspended below grass mowing machine frame members 106, 107 and may have a height of cut system for adjusting the vertical position of the mower deck relative to the frame and the ground. The height of cut system may include a parallelogram linkage between the frame and the mower deck. The parallelogram linkage may include right and left rear draft links 108, 110 connecting between frame members 106, 107 and right and left rear deck brackets 112, 114, and front linkage 116 connecting between frame members 106, 107 and deck front bracket 118. The height of cut system also may include foot pedal 120 to raise and lower mower deck 104 between different height of cut settings. Foot pedal 120 may be pivotably mounted to frame member 106, or alternatively to frame member 107, and pivotably connected to power transfer link 124 which may extend rearward where it may be pivotably connected to right rear draft link 108, or alternatively to left rear draft link 110. Rock shaft 126 may extend laterally across the grass mowing machine frame to connect and provide a pivot axis for right rear draft link 108 and left rear draft link 110, so the pair of rear draft links may move together when operating foot pedal 120. Alternatively, the mower deck may be raised and lowered with a hand lever connected to the parallelogram linkage for pivoting the rock shaft, instead of a foot pedal.

In one embodiment, mower deck level adjuster 102 may include at least one adjuster bracket 128, 130 pivotably attached to at least one of rear draft links 108, 110. Preferably, right and left adjuster brackets 128, 130 are pivotably attached to right and left rear draft links 108, 110. Each adjuster bracket may be a sheet metal component that may be configured and installed on existing height of cut systems on conventional multi-blade mower decks. The second or forward end of each adjuster bracket 128, 130 may have a plurality of adjuster bracket holes 132, 134. The plurality of adjuster bracket holes may provide a plurality of positions where the forward end of the adjuster bracket may be attached to a rear draft link. For example, pin 136, 138 may be inserted through an adjuster bracket hole 132, 134, and a hole 140, 142 in rear draft link 108, 110. Each pin 136, 138 may be retained by clip 144, 146 on one end of the pin, and head 148, 150 on the other end of the pin.

In one embodiment, each adjuster bracket 128, 130 also may be pivotably attached to a rear draft link 108, 110 on first pivot axis 151, 153 and to a rear deck bracket 112, 114 on second pivot axis 155, 157 parallel to the first pivot axis. Each first pivot axis 151, 153 may be defined by a pin 152, 154 inserted through a hole 156, 158 adjacent the first or rearward end of the adjuster bracket, and a hole 160, 162 adjacent the first or rearward end of the rear draft link. Each pin 152, 154 may be retained with clip 159, 161. Various alternative retaining devices may be used to retain pins 152, 154 in place. Each second pivot axis 155, 157 may be defined by a pin 164, 166 inserted through a hole 168, 170 in one of rear deck brackets, a hole 172, 174 adjacent the first or rearward end of one of adjuster brackets, and a slot 176, 178 adjacent the first or rearward end of one of rear draft links 108, 110. Each pin 164, 166 may be retained by clip 180, 182 on one end of the pin, and head 184, 186 on the other end of the pin. Various retaining devices also may be used to retain pins 164, 166. Each adjuster bracket may be pivoted relative to each rear draft link in a scissoring manner to adjust and secure the mower deck at a level position at any cutting height. The scissoring action changes the effective length of each rear draft link of the parallelogram linkage.

In one embodiment, mower deck level adjuster 102 may be used to level the mower deck along with a conventional level gauge or measuring device to indicate the mower deck or blade height. Mower deck level adjuster 102, however, does not require use of hand tools to engage or rotate any threaded linkages, or to secure the mower deck at a level position. Mower deck level adjuster 102 may be used by following these steps with the grass mowing machine parked on a level surface and the mower deck raised or lowered to a desired position for leveling. Pin 136 may be removed from one of adjuster bracket holes 132 on the right side of the mower deck. With pin 136 removed, the operator may use grip 188 to pivot adjuster bracket 128 on first pivot axis 151, moving the right rear of the mower deck up or down toward the level height specified by the level gauge. When the deck reaches the level height specified by the level gauge, the operator may reinsert pin 136 in the appropriate adjuster bracket hole 132. Adjuster bracket holes 132 may be radially spaced relative to first pivot axis 151. Pin 136 may secure the right side of the mower deck at the level position, and clip 144 may retain the pin in place. The operator then may repeat the same steps to level the left side of the mower deck. Each adjuster bracket may be pivoted and positioned independently of the other adjuster bracket. The operator first may remove pin 138 from one of the adjuster bracket holes 134 on the left side of the mower deck, then use grip 190 to pivot adjuster bracket 130 until the left rear of the mower deck is at a level position on the height gauge, reinsert pin 138 in the appropriate adjuster bracket hole, and retain the pin with clip 146.

A preferred embodiment of the mower deck level adjuster includes adjuster brackets on the rear draft links, but the mower deck level adjuster also may include adjuster brackets pivotably attached to the front draft links, allowing the operator to adjust the mower deck from the front instead of the rear. In this alternative embodiment, the adjuster brackets may be connected to the front draft links as well as to the front of the mower deck, in the same manner as in the first embodiment. Thus, the present invention may be used with draft links supported by frame of a grass mowing machine connected to the front and/or rear of a mower deck.

Having described the preferred embodiment, it will become apparent that various modifications can be made without departing from the scope of the invention as defined in the accompanying claims.

We claim:

1. A mower deck level adjuster, comprising:
   a draft link pivotably supported by a frame of a grass mowing machine; and
   an adjuster bracket having a first end pivotably connected to a slot in the draft link and to a deck bracket on a mower deck, and a second end connected to the draft link by a pin insertable through any of a plurality of adjuster bracket holes to level the mower deck.

2. The mower deck level adjuster of claim 1 further comprising a rock shaft extending across the frame and connected to the draft link.

3. The mower deck level adjuster of claim 1 wherein the adjuster bracket is sheet metal.

4. The mower deck level adjuster of claim 1 wherein the adjuster bracket is pivotably connected to the slot in the draft link on a first pivot axis adjacent a rearward end of the adjuster bracket.

5. The mower deck level adjuster of claim 4 wherein the adjuster bracket is pivotably connected to the deck bracket on a second pivot axis adjacent the first end of the adjuster bracket.

6. A mower deck level adjuster, comprising:
   a right adjuster bracket and a left adjuster bracket attached to a right draft link and a left draft link pivotably supported by a frame of a grass mowing machine;
   the right adjuster bracket and the left adjuster bracket each having a first end connected to a slot in the respective draft link and to a mower deck, and a second end attached at a plurality of different positions to the respective draft link, each adjuster bracket pivotable with respect to the respective draft link to level the mower deck.

7. The mower deck level adjuster of claim 6 wherein the first end of each adjuster bracket is connected to the mower deck by a pivot pin, and the second end of each adjuster bracket is connected to one of the draft links by a pin inserted through any of a plurality of adjuster holes in the adjuster bracket.

8. The mower deck level adjuster of claim 6 further comprising a rock shaft extending laterally across the frame between the right draft link and the left draft link.

9. The mower deck level adjuster of claim 8 further comprising a pedal connected to the rock shaft for raising and lowering the mower deck to a plurality of different cutting heights.

10. The mower deck level adjuster of claim 6 further comprising a pair of deck brackets on the mower deck and wherein each adjuster bracket is connected to the mower deck by one of the deck brackets.

11. The mower deck level adjuster of claim 10 further comprising a pin connecting each adjuster bracket to one of the deck brackets, the pin extending through a slot in a first end of each rear draft link.

12. A mower deck level adjuster, comprising:
    a pair of draft links,
    a pair of adjuster brackets,
    and a pair of deck brackets on the mower deck, each draft link connected to a frame of a grass mowing machine and pivotable to a plurality of different cutting heights using a foot pedal for raising and lowering the mower deck; and each adjuster bracket having a rearward end attached to a respective one of the draft links and to a respective one of the deck brackets; each adjuster bracket having a forward end attachable at a plurality of different positions to its respective one of the draft links to level the mower deck.

13. The mower deck level adjuster of claim 12, wherein each adjuster bracket includes a pin insertable through any one of a plurality of adjuster bracket holes for attaching the adjuster bracket to its respective one of the draft links.

14. The mower deck level adjuster of claim 12, further comprising a rock shaft extending laterally across the frame connecting the pair of draft links together.

15. The mower deck level adjuster of claim 12, wherein the rearward end of each adjuster bracket is pivotably connected to its respective one of the pair of draft links on a first pivot axis, and pivotably connected to its respective one of the pair of deck brackets on a second pivot axis parallel to the first pivot axis.

16. The mower deck level adjuster of claim 12, wherein each adjuster bracket may be adjusted independently of the other adjuster bracket.

17. The mower deck level adjuster of claim 12, wherein each adjuster bracket is sheet metal.

\* \* \* \* \*